United States Patent
Arndt et al.

(10) Patent No.: US 9,029,287 B2
(45) Date of Patent: May 12, 2015

(54) COMPONENT HAVING A CATALYTIC SURFACE, METHOD FOR THE PRODUCTION THEREOF, AND USE OF SAID COMPONENT

(75) Inventors: Axel Arndt, Berlin (DE); Christian Doye, Berlin (DE); Jens Dahl Jensen, Berlin (DE); Ursus Krüger, Berlin (DE); Uwe Pyritz, Berlin (DE); Oliver Stier, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 930 days.

(21) Appl. No.: 12/998,718

(22) PCT Filed: Nov. 9, 2009

(86) PCT No.: PCT/EP2009/064828
§ 371 (c)(1),
(2), (4) Date: Aug. 8, 2011

(87) PCT Pub. No.: WO2010/057800
PCT Pub. Date: May 27, 2010

(65) Prior Publication Data
US 2011/0293495 A1   Dec. 1, 2011

(30) Foreign Application Priority Data

Nov. 24, 2008   (DE) .......................... 10 2008 059 165

(51) Int. Cl.
*B01J 23/32*   (2006.01)
*B01J 23/58*   (2006.01)
(Continued)

(52) U.S. Cl.
CPC ............. *B01J 23/34* (2013.01); *B01D 53/8675* (2013.01); *B01D 2255/104* (2013.01);
(Continued)

(58) Field of Classification Search
USPC .................................................. 502/324, 330
IPC ................. B01J 23/34,23/50, 23/687, 23/8991, B01J 23/8978
See application file for complete search history.

(56) References Cited

U.S. PATENT DOCUMENTS 4,871,709 A * 10/1989 Tatsushima et al. .......... 502/324
5,196,390 A *  3/1993 Tauster et al. ................. 502/251
(Continued)

FOREIGN PATENT DOCUMENTS

CN         1524011        8/2004
DE         30 03 793      8/1981
(Continued)

OTHER PUBLICATIONS

International Search Report for PCT/EP2009/064828, mailed on Mar. 15, 2010.
(Continued)

*Primary Examiner* — Patricia L Hailey
(74) *Attorney, Agent, or Firm* — Staas & Halsey LLP

(57) ABSTRACT

A component part has a catalyst surface. This surface has metallic components and components of $MnO_2$ (13) in contact with the former. The metallic components are preferably formed of Ag and/or Ni. These material pairs achieve a great improvement in catalyst action compared to the pure metals. Especially in the case of use of Ni, which is toxicologically safe, these surfaces, for example, may also find use in ambient air purification for reduction of the ozone content. The surface can be applied, for example, by a coating of the component part, in which case the metallic component and the component of $MnO_2$ are applied in two layers.

14 Claims, 3 Drawing Sheets

(51) Int. Cl.
    *B01J 23/34*     (2006.01)
    *B01D 53/86*     (2006.01)
    *B01J 23/68*     (2006.01)
    *B01J 23/889*    (2006.01)
    *B01J 37/02*     (2006.01)
    *C23C 24/04*     (2006.01)

(52) U.S. Cl.
    CPC ............ *B01D 2255/2073* (2013.01); *B01D 2255/20753* (2013.01); *B01D 2255/9022* (2013.01); *B01D 2255/9202* (2013.01); *B01D 2257/106* (2013.01); *B01D 2259/4575* (2013.01); *B01J 23/688* (2013.01); *B01J 23/8892* (2013.01); *B01J 37/0225* (2013.01); *C23C 24/04* (2013.01)

(56) References Cited

U.S. PATENT DOCUMENTS

| | | | |
|---|---|---|---|
| 5,997,829 A * | 12/1999 | Sekine et al. | 423/210 |
| 6,281,159 B1 | 8/2001 | Fromson et al. | |
| 6,486,092 B2 | 11/2002 | Fromson et al. | |
| 2003/0228414 A1 | 12/2003 | Smith et al. | |
| 2004/0226699 A1 | 11/2004 | Morgan | |
| 2008/0237036 A1 | 10/2008 | Barker et al. | |

FOREIGN PATENT DOCUMENTS

| | | | |
|---|---|---|---|
| EP | 0 399 302 | 11/1990 | |
| EP | 1 395 350 | 3/2004 | |
| EP | 1 395 350 B1 | 5/2005 | |
| EP | 2 119 491 * | 11/2009 | ............ B01D 53/86 |
| GB | 1346853 | 2/1974 | |
| JP | 63-21751 | 1/1988 | |
| JP | 63-021751 * | 1/1988 | ............ H01M 4/50 |
| RU | 2024295 | 12/1994 | |
| RU | 2052287 | 1/1996 | |
| RU | 2069774 | 11/1996 | |
| RU | 24634 | 8/2002 | |
| WO | 02/092194 | 11/2002 | |
| WO | 2008/088027 | 7/2008 | |

OTHER PUBLICATIONS

Russian Office Action for related Russian Patent Application No. 2011125932, issued on Oct. 5, 2012.
German Office Action for co-pending German Patent Application No. 10 2008 059 165.3, issued Jan. 30, 2014, 6 pages.
Chinese Office Action for related Chinese Patent Application No. 200980147339.1, issued Dec. 4, 2012.
Russian Office Action for related Russian Patent Application No. 2011125932/04, received Mar. 27, 2013, 12 pages.
Office Action mailed Jan. 5, 2015 for corresponding Indian Patent Application No. 2076/KOLNP/2011.

* cited by examiner

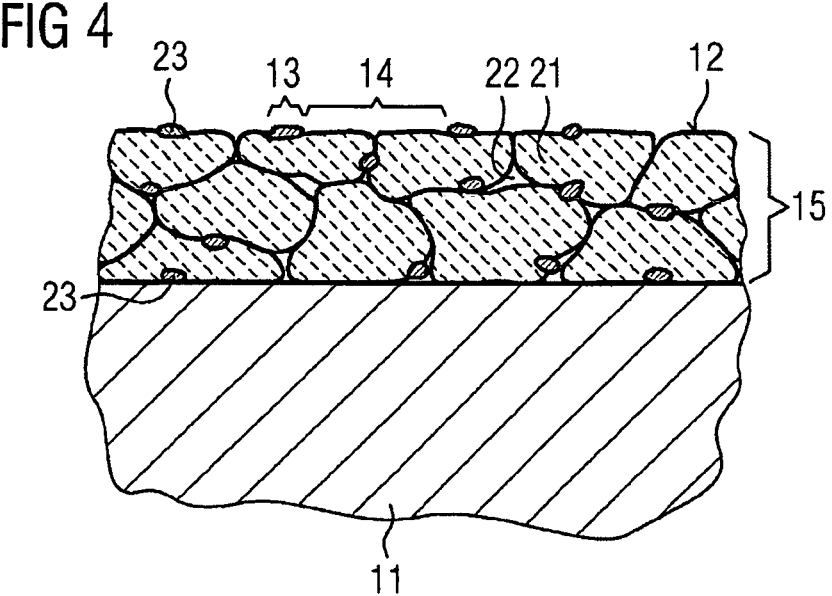
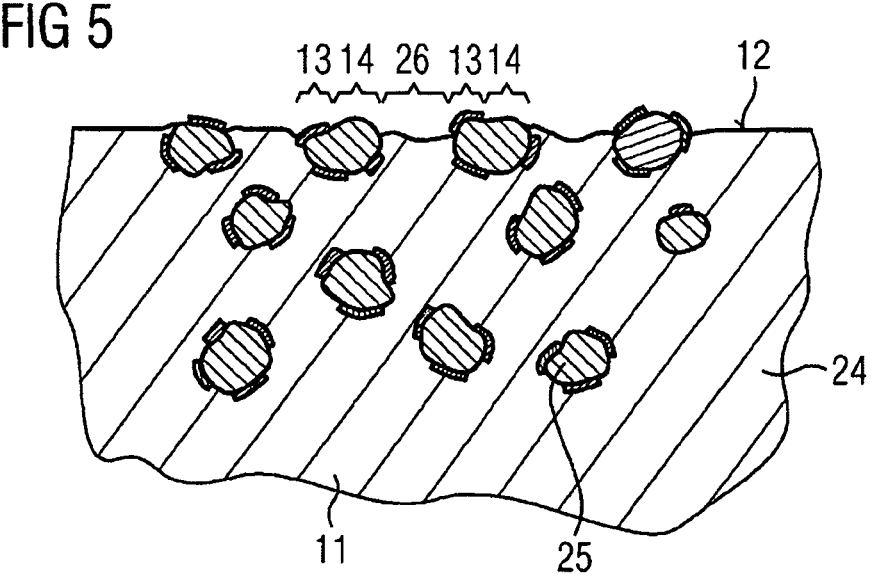

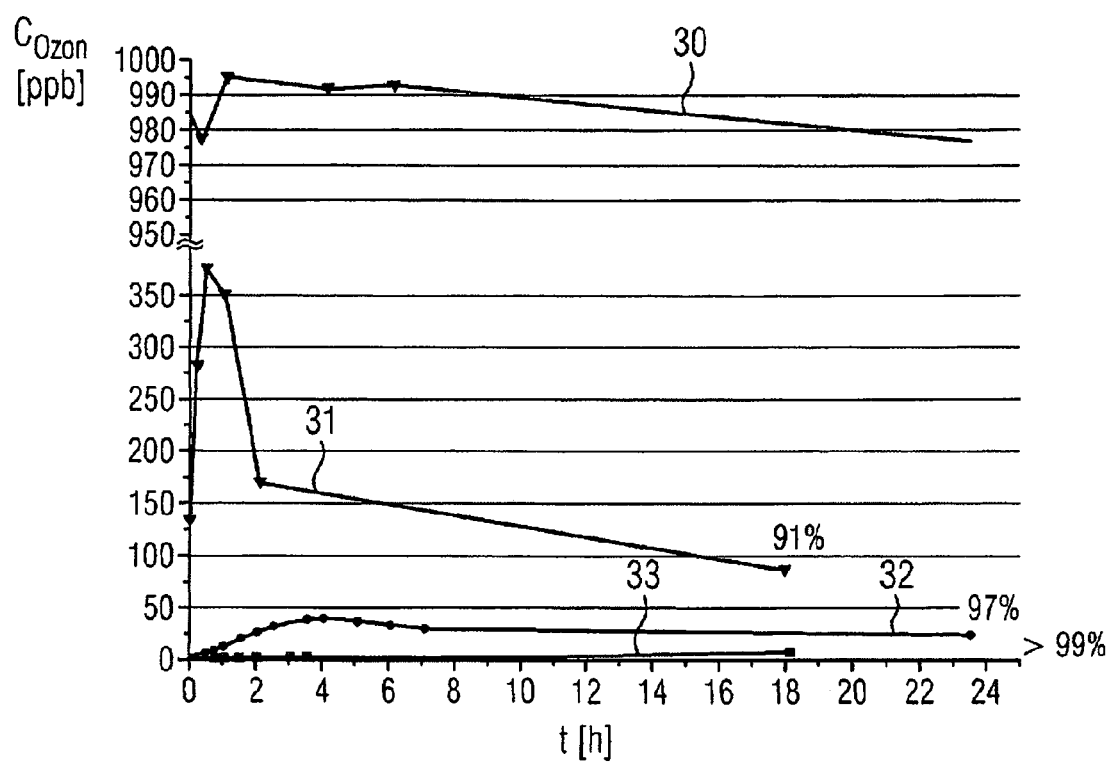

COMPONENT HAVING A CATALYTIC SURFACE, METHOD FOR THE PRODUCTION THEREOF, AND USE OF SAID COMPONENT

CROSS REFERENCE TO RELATED APPLICATIONS

This application is based on and hereby claims priority to International Application No. PCT/EP2009/064828 filed on Nov. 9, 2009 and German Application No. 10 2008 059 165.3 filed on Nov. 24, 2008, the contents of which are hereby incorporated by reference.

BACKGROUND

The invention relates to a component part having a catalyst surface. The invention also relates to a process for producing a catalyst surface on a component part by cold gas spraying.

A catalyst surface on a component part is known, for example, according to US 2003/0228414 A1. This catalyst surface can be obtained on the component part by a direct deposition of a catalytically active substance. For this purpose, cold gas spraying is used, in which the particles of the catalytic laminate material are fed into what is called a cold gas jet, a process gas flowing at supersonic velocity. In the cold gas jet, these particles are accelerated toward the surface of the component part to be coated and remain adhering on this surface with conversion of the kinetic energy thereof.

SUMMARY

It is one possible object to specify a component part with a catalyst surface, a process for production thereof and a use of said component part, wherein the catalyst surface should have a comparatively high catalytic activity.

The inventors proposed using the component part cited at the outset and a cold spraying process, wherein the catalyst surface is formed from metallic components and components of $MnO_2$ in contact with the former. In order to produce such a layer, the catalyst surface is obtained in the cold gas spraying by spraying of $MnO_2$ particles, said $MnO_2$ forming only components of the catalyst surface and metallic components of the catalyst surface also being provided, each of which adjoin the components of the $MnO_2$. The metallic components may, as will be explained in detail below, be provided by the metallic surface of the component part to be coated or by addition of metallic particles to the cold gas jet.

The use of $MnO_2$ as a pair with a metal can achieve a particularly high catalytic activity of the catalyst surface formed. It has been found that, surprisingly, the catalytic activity of $MnO_2$, which is known per se, can be increased by metallic components at the surface, even though the catalytic surface area of the $MnO_2$ available is reduced overall. This is contrary to the expected result that a reduction in the real surface area of $MnO_2$ available, in the case of incomplete coverage of the surface of the component part, is accompanied by a proportional loss of catalyst activity.

It is thus advantageously possible to produce components with comparatively efficient catalyst surfaces by covering components of the catalyst surface with a metal instead of with $MnO_2$. The surface of the component part must thus not be covered completely with the metallic components and the components of $MnO_2$. Partial coating is already sufficient to achieve the catalytic action. Depending on the application, the latter should be selected to be of such a magnitude that the catalytic surface available is sufficient for the desired effect for conversion, for example, of ozone. The proportion of $MnO_2$ in relation to the total area formed by the two components should be at least 10%, preferably 30 to 70%, especially 50%.

In an advantageous configuration, the $MnO_2$ is present at least partly in the γ polymorph. The γ polymorph is a structure of the crystal formed by the $MnO_2$ which advantageously exhibits a particularly strong catalytic action. However, the real structure of the $MnO_2$ is generally not present exclusively in the γ polymorph but partly also in other polymorphs (for example the β polymorph of $MnO_2$). However, in a particular configuration, the structural proportion of the $MnO_2$ in the γ polymorph should be more than 50% by weight.

In another configuration, the component part is formed of the metal which provides the metallic component and an only partly covering layer of $MnO_2$ has been applied to this component part. These component parts are, for example, composed of Ag or Ni, and, due to their material composition, already provide one constituent required for the production of the catalytic surface. On these component parts, production of the surface is advantageously possible in a particularly simple manner, by applying a non-covering layer of the other component of the surface, namely $MnO_2$.

Conversely, it is also conceivable that the component part is formed of a ceramic which provides the component of $MnO_2$, and an only partially covering layer of the metal has been applied to this component part. For example, the component part could be designed as a wear-stressed ceramic component part. The latter need also not be formed exclusively of $MnO_2$. For example, it is conceivable that the ceramic is produced as a sintered ceramic from different kinds of particles, in which case the $MnO_2$ constitutes one kind of these particles. However, it should be considered in this variant that the processing temperatures for the component part must be below 535° C., since the $MnO_2$ is converted to MnO at this temperature, and hence loses its excellent catalytic properties in the material pair.

In another configuration, the component part has a coating which provides the metallic components and the components of $MnO_2$ of the surface. In this variant, component parts of different materials can be coated, in which case the catalytic properties of the layer are advantageously caused solely by the nature of the layer or of the catalytic surface formed thereby. In this case, a suitable coating process has to be selected in each case for the relevant material of the component part.

Particularly advantageously, the component part may have a lattice structure. This may be a lattice with a two-dimensional configuration, i.e. an essentially flat component part. However, it is also possible to form three-dimensional lattice structures which can be produced, for example, by rapid prototyping technologies. The lattice structures offer the important advantage that, on the one hand, the surface area available for the application of the catalytic active partners is increased, but, on the other hand, the flow resistance generated by the lattice structure is comparatively minor. Lattice component parts can therefore advantageously be used in ventilation channels. It is particularly advantageous to use them, for example, in extractor hoods, in which case the lattice structure forms the outlet grille thereof for cleaned waste air. This application is used in what are called recirculating air hoods, in which, in contrast to vented air hoods, the air sucked in is not removed from the building but remains therein.

In order to achieve, in extractor hoods working by the air recirculation principle, not only freeing of the air from solids, aerosols and ultrasmall particles, as present, for example, in cooking vapor, but also to achieve freeing from odors, the related art uses plasma generators which have a high-voltage discharge source with which the air is enriched with atomic oxygen. The latter brings about a decomposition or oxidation process which fragments the carbon compounds responsible for the odors which arise and eliminates the odors in this way. However, this process also gives rise to ozone, which can be converted to diatomic oxygen by a catalytic route by the component parts. This advantageously allows activated carbon filters to be dispensed with, which disadvantageously offer a comparatively high air resistance to the air flow in the extractor hood and also have to be changed at regular intervals.

The process used for production of the layer on the component part may, for example, be cold gas spraying, in which case the catalytic surface is obtained by spraying on $MnO_2$ particles. In this case, the $MnO_2$ forms only components of the catalytic surface; the metallic components are formed, for example, by Ni and/or Ag. The metallic components can, as already described, be provided either by the component part itself, or they are added as particles to the cold gas jet, such that the metallic components of the surface are also formed by the layer which forms.

More particularly, it is also possible to use $MnO_2$ particles which at least partly have the γ polymorph of the $MnO_2$ structure. In this case, the cold gas spraying must always be conducted with operating temperatures below the decomposition temperature of the γ polymorph. This temperature is 535° C. In terms of process technology, in the selection of the temperature of the cold gas jet, a certain safety margin can be maintained from this decomposition temperature. In contrast, it has been found that brief exceedance of this temperature when the $MnO_2$ particles hit the surface has no effects in terms of structure because this temperature increase occurs extremely locally only in the surface region of the processed $MnO_2$ particles. The particular core of the particles, which remains within an uncritical temperature range, is apparently capable of sufficiently stabilizing the γ polymorph of the particle structure such that the γ polymorph of the $MnO_2$ structure is also preserved at the catalytically active surface of the particles.

In addition, an increase in the $MnO_2$ above 450° C. leads to a conversion of the $MnO_2$ to $Mn_2O_3$. However, this process proceeds only slowly, such that a brief exceedance of the temperature, as occurs in cold gas spraying, is harmless.

In order to obtain the excellent catalytic properties of the $MnO_2$, the γ polymorph of the structure must be at least partly present in the $MnO_2$ particles. This can be achieved by a mixture of the $MnO_2$ particles with manganese oxide particles of other polymorphs (e.g. β polymorph of $MnO_2$). Another possibility is that the particles be formed of phase mixtures, such that the γ polymorph of the $MnO_2$ is not the only one present in the particles.

In addition, it is advantageous when the $MnO_2$ particles processed are nanoparticles having a diameter of >100 nm. Nanoparticles in the context of this invention are understood to mean particles which are <1 µm in diameter. This is because it has been found that, surprisingly, such small particles of $MnO_2$ can be deposited with a high deposition efficacy on the catalytic surface. Normally, in contrast, it is assumed that particles of less than 5 µm cannot be deposited by cold gas spraying since, due to the small mass of these particles, the kinetic energy imparted by the cold gas jet is insufficient for deposition. It is not possible to explain exactly why this is not true specifically for $MnO_2$ particles. Apparently, not only the effect of kinetic deformation but also other adhesion mechanisms are involved in the layer formation process.

The processing of nanoparticles of $MnO_2$ has the advantage that a comparatively high specific surface area and hence a very marked catalytic action can be achieved with comparatively little material. The boundaries between the components of $MnO_2$ and metallic components of the catalytic surface are also advantageously lengthened significantly in this way, which likewise leads to highly pronounced catalytic properties.

It is advantageous when a mixture of $MnO_2$ particles and metallic particles is used for the metallic components of the catalytic surface, i.e. Ni and/or Ag. More particularly, suitable selection of temperature and particle velocity in the cold gas jet allows the energy input into the particles to be controlled such that the specific (or internal) surface area which forms the catalytic surface in the layer produced is controlled. This is because a higher porosity of the layer produced allows the internal surface area to be increased, in order to provide an increased catalytic surface area. This thus allows the bactericidal action to be increased. In contrast, however, it may also be advantageous when the surface is configured to be very smooth, in order to counteract any soiling tendency.

In addition to deposition by cold gas spraying, other production processes are of course also conceivable. For example, the catalytic surface can be produced electrochemically. In this case, the metallic component of the catalytic surface is deposited as a layer electrochemically from an electrolyte in which particles of $MnO_2$ are suspended. These are then incorporated into the layer which forms during the electrochemical deposition process and hence also form a component of $MnO_2$ at the surface of the layer.

A further process can be obtained by producing the layer from a ceramic which at least comprises $MnO_2$. For this purpose, a mixture of preceramic polymers which form precursors of the desired ceramic and metal particles in a solution can be applied to the component part to be coated. First the solvent is evaporated, then a heat treatment, which is advantageously below the decomposition temperature of the γ polymorph of $MnO_2$ (535° C.), can effect conversion to the ceramic. It is even better when the temperature remains below 450° C. in order to prevent the formation of $Mn_2O_3$.

The processes mentioned can, among others, also produce the configurations which follow in the component part. For instance, the coating produced may have a metallic layer to which an only partly covering layer of $MnO_2$ has been applied. The metallic layer thus forms the metallic component of the surface which appears at the sites where it is not covered by the layer of $MnO_2$. In this configuration of the component part, advantageously only a very small proportion of $MnO_2$ is needed. It is also conceivable in this case to employ the manufacturing processes detailed above in combination. For example, the metallic layer can be produced by electroplating and the only partly covering layer of $MnO_2$ by cold gas spraying.

Another possibility is that the coating has a ceramic layer which provides the proportion of $MnO_2$, to which an only partly covering metallic layer has been applied. This configuration of the component part is of significance when the properties of the ceramic layer are advantageous for the component part for construction reasons (for example corrosion protection).

It is also possible that the coating is formed of a ceramic which provides the proportion of $MnO_2$, into which metallic particles are embedded. It is especially advantageous when the ceramic layer is wear-stressed and should preserve its catalytic properties with continuing wear, i.e. removal of the layer. The latter is ensured by, in the course of removal of the ceramic layer, continual exposure of $MnO_2$ particles which ensure the proportion of $MnO_2$ at the surface. It is of course also conceivable that the layer has a metallic matrix into which the particles of $MnO_2$ are embedded. For this layer too, the argument applies that, in the event of layer removal, the catalytic properties thereof are preserved.

The component part may also be configured such that it or a layer applied thereto is formed of a material other than the metallic component and other than $MnO_2$, and particles present therein (in the case of wear stress, see above) and/or thereon in each case provide the metallic components and the components of $MnO_2$ at the surface thereof (what is meant is the surface of the particles). These are advantageously tailored particles with catalytic properties, which can be introduced universally onto any surface or into any matrix. In this case, the process suitable for introduction or application has to be selected in each case. This measure also allows, for example, plastic component parts with catalytic properties to be produced. The particles introduced into the layer or the component part are either exposed in the course of wear stress or may, in the case of a porous structure of the component part, also be involved in the catalytic action when they form the walls of the pores.

The invention finally relates to use of the component part already described for reduction of the ozone content of a gas which passes over the catalyst surface. This gas can primarily be provided by the earth's atmosphere. Under particular conditions, the air is enriched with ozone, for example on hot summer days in city centers or else in relatively high atmospheric layers which are used in aviation. Since ozone is harmful to the health of the human organism, breathable air which is pumped from the atmosphere into the interior of motor vehicles or else into the passenger cabin of an aircraft can be substantially free of ozone by the catalyst surface. It will be appreciated that applications in chemical process technology are also conceivable.

The catalyst surface can be configured, for example, as an inner lining of air-conducting conduit systems. This has the advantage that, by virtue of provision of the catalyst surface, no additional flow barrier need be incorporated into the air-conducting channels. In order to increase the catalyst surface area available, the air conduction system can also be provided with an air-pervious insert around which the air sucked in must flow.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 1 to 5: different working examples of the proposed component part with different catalyst surfaces and FIG. 6: measurement curves of the catalytic action of a working example of the proposed catalyst surface compared to reference surfaces.

DETAILED DESCRIPTION OF THE PREFERRED EMBODIMENT

Figure 1:
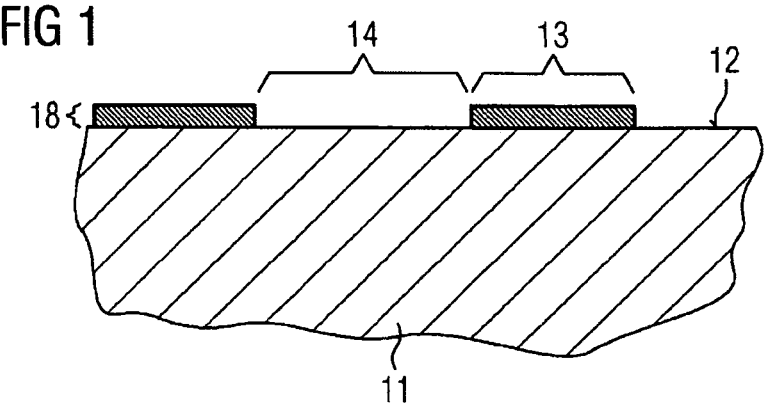

Reference will now be made in detail to the preferred embodiments of the present invention, examples of which are illustrated in the accompanying drawings, wherein like reference numerals refer to like elements throughout.

FIGS. 1 to 5 each show a component part 11 with a surface 12 which has catalytic properties. These properties are obtained by virtue of the surface in each case having a component 13 of $MnO_2$, and additionally by virtue of provision of a metallic component 14 composed of Ag or Ni. The component part could, for example, be an air conduction channel, the inner walls of which form said surface.

However, the structure of the component parts 11, each of which is shown in section, has differences. The component part according to FIG. 1 itself is formed of Ni or Ag, such that the surface 12 thereof automatically provides the metallic component 14. On the surface 12 are additionally formed island-like regions of $MnO_2$ which provide the component 13. These can be applied, for example, as a non-covering coating by cold gas spraying.

Figure 2:
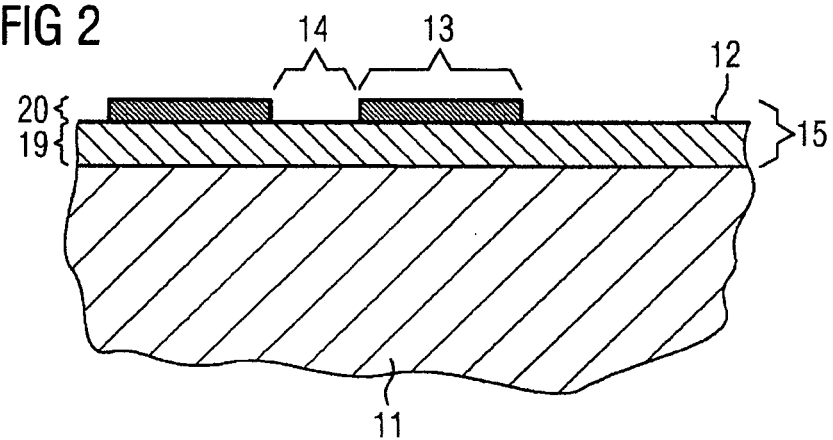

FIG. 2 shows a component part 11 which is formed of a material unsuitable for generation of the catalytic properties of the surface. Therefore, a metallic layer 15 of Ni or Ag is applied to this component part 11. On this layer, which provides the component 14, $MnO_2$ is applied in the manner described for FIG. 1, so as also to give rise to components 13.

Figure 3:
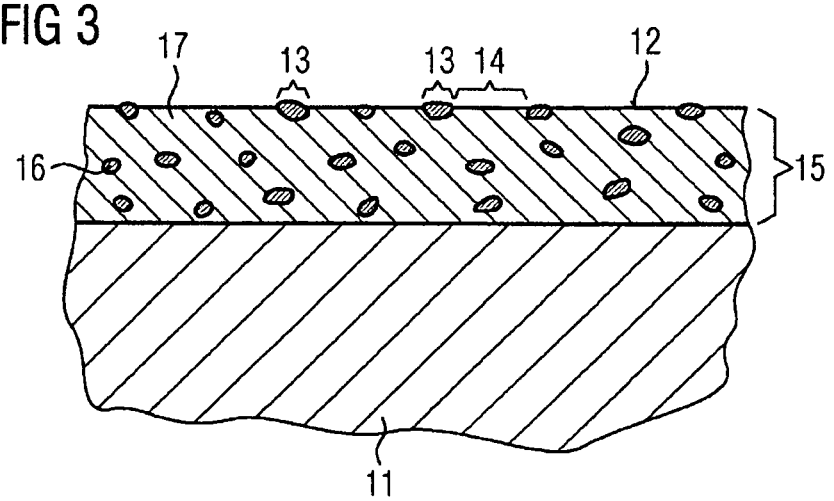

FIG. 3 shows that the metallic layer can also be doped with particles 16 of $MnO_2$, which means that these particles are present in the metallic matrix 17 of the metallic layer 15. In this respect, they also form that part of the surface 12 which provides the component 13. The remainder of the surface is formed by the component 14.

In FIG. 4, the coating 15 is formed by a ceramic matrix 21, which has pores 22 which increase the internal surface area compared to the external surface area 12 of the component part and thus also enhance a catalytic effect. In the ceramic matrix 21, metallic particles 23 are provided, which both provide the component 13 at the surface 12 and can become catalytically active in the pores. As also in FIG. 2 and FIG. 3, the component part 11 according to FIG. 4 may be formed of any material, it being necessary merely to ensure adhesion of the coating 15 on the component part 11.

The component part 11 according to FIG. 5 has a matrix of any material 24, for example plastic. Particles 25 have been introduced into it, the particular surfaces of which have both metallic components of Ni or Ag and components of $MnO_2$. In the working example according to FIG. 5, the particles themselves are formed of the metal and the ceramic components are formed on the surface of the particles. It will be appreciated that the reverse case is also conceivable. The particles are partly exposed at the surface 12 of the component part 11, as a result of which the metallic components 14 and the components 13 of $MnO_2$ 13 are formed. In addition, there are components 26 of the plastic surface 26 which are not catalytically active. The ratio of the components mentioned can be influenced directly by the filling level of particles 25 in the material 24.

FIG. 6 shows the measurements on a component part with different catalytic surfaces. In this figure, the ozone concentration in air with steady-state flow is plotted on the Y axis (unit: ppb). On the X axis is plotted the duration of the steady-state flow.

The ozone content in the air with steady-state flow was between 980 and 1000 ppb, as can be inferred from the curve 30. If the catalyst surface used is a surface with components of Ag and Pd, the result is curve 31. It is found that, in the case of a prolonged use time, approx. 90% of the ozone present in the air with steady-state flow has been degraded.

In addition, a silver sample of equal area covered completely with MnO was used (Ag was not the surface-forming component but merely the material of the component part).

The curve 32 was measured with this sample, and it can be seen that the sample has settled out at a degradation of 97% of the ozone present in the air with steady-state flow.

With the catalyst surface being formed in each case of half of the Ag surface and of half of MnO, it is possible to achieve a further improvement in the catalytic properties in comparison thereto. The measurement curve 33 shows that, with this catalyst surface, it is possible in a lasting manner to degrade more than 99% of the ozone present in the air with steady-state flow.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A component part with a catalyst surface, comprising:
    a component body; and
    the catalyst surface provided on the component body, the catalyst surface comprising metallic area components and manganese oxide area components in contact with the metallic components, the metallic components being formed from a non-manganese metal, wherein
    the catalyst surface is formed from a coating which provides the metallic area components and the manganese oxide area components,
    the coating is formed from a metallic matrix into which manganese oxide particles have been embedded,
    the metallic matrix forms the metallic area components, and
    the manganese oxide particles form the manganese oxide area components.

2. The component part as claimed in claim 1, wherein the manganese oxide comprises a γ polymorph of $MnO_2$.

3. The component part as claimed in claim 2, wherein more than 50% by weight of the manganese oxide is the γ polymorph of $MnO_2$.

4. The component part as claimed in claim 1, wherein the catalyst surface comprises a metallic surface portion and a manganese oxide surface portion,
    the metallic area components and the manganese oxide area components define the metallic surface portion and the manganese oxide surface portion, respectively, and
    the manganese oxide surface portion consumes at least 10% of a total surface area occupied by the metallic surface portion and the manganese oxide surface portion.

5. The component part as claimed in claim 1, wherein the catalyst surface comprises a metallic surface portion and a manganese oxide surface portion,
    the metallic area components and the manganese oxide area components define the metallic surface portion and the manganese oxide surface portion, respectively, and
    the manganese oxide surface portion consumes between 30 and 60% of a total surface area occupied by the metallic surface portion and the manganese oxide surface portion.

6. The component part as claimed in claim 1, wherein the metallic area components consist of Ag and/or Ni.

7. The component part as claimed in claim 1, wherein the metallic area components are formed from at least one metal selected from the group consisting of Ag and Ni.

8. The component part as claimed in claim 1, wherein a lattice structure is formed from the component body and the catalyst surface.

9. The component part as claimed in claim 8, wherein the lattice structure is a ventilation grille.

10. The component part as claimed in claim 8, wherein the lattice structure is a ventilation outlet grille of an extractor hood or a flow-through plasma generator.

11. A process for producing a catalyst surface, comprising:
    depositing a mixture of $MnO_2$ particles and metallic particles on a component part by cold gas spraying, the $MnO_2$ particles forming $MnO_2$ area components, the metallic components forming metallic area components, wherein
    the metallic area components adjoin the $MnO_2$ area components,
    the metallic particles and the metallic area components are formed from a non-manganese metal, and
    the $MnO_2$ particles are nanoparticles having a diameter of greater than 100 nm.

12. The process as claimed in claim 11, wherein $MnO_2$ particles comprises a γ polymorph of $MnO_2$, and cold gas spraying is conducted at an operating temperature below the decomposition temperature of the γ polymorph of $MnO_2$.

13. The process as claimed in claim 11, wherein the specific surface area of the catalyst surface is controlled by an energy input into a cold gas jet used for the cold gas spraying.

14. A purification method comprising:
    providing a lattice structure comprising:
        a component body; and
        a catalyst surface provided on the component body, the catalyst surface comprising metallic area components and manganese oxide area components in contact with the metallic components, the metallic components being formed from a non-manganese metal;
    passing a gas over the catalyst surface and through the lattice; and
    catalytically reducing an ozone content in the gas with the catalyst surface, wherein
    the catalyst surface is formed from a coating which provides the metallic area components and the manganese oxide area components,
    the coating is formed from a metallic matrix into which manganese oxide particles have been embedded,
    the metallic matrix forms the metallic area components, and
    the manganese oxide particles form the manganese oxide area components.

* * * * *